(12) United States Patent
Furuya et al.

(10) Patent No.: US 12,099,004 B2
(45) Date of Patent: Sep. 24, 2024

(54) GAS DETECTION DEVICE (71) Applicant: Asahi Kasei Microdevices Corporation, Tokyo (JP)

(72) Inventors: Takaaki Furuya, Tokyo (JP); Shota Isshiki, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 46 days.

(21) Appl. No.: 17/656,468

(22) Filed: Mar. 25, 2022

(65) Prior Publication Data

US 2022/0317034 A1 Oct. 6, 2022

(30) Foreign Application Priority Data

Mar. 29, 2021 (JP) .................................. 2021-055152
Mar. 22, 2022 (JP) .................................. 2022-046119

(51) Int. Cl.
*G01N 21/3504* (2014.01)

(52) U.S. Cl.
CPC ..... *G01N 21/3504* (2013.01); *G01N 2201/062* (2013.01)

(58) Field of Classification Search
CPC ......... G01N 21/3504; G01N 2201/062; G01N 21/3518; G01N 21/01; G01N 2021/0112; G01N 2201/06113
See application file for complete search history.

(56) References Cited

U.S. PATENT DOCUMENTS

| 5,059,397 | A | * | 10/1991 | Melly | G01N 21/3504 356/438 |
| 5,066,475 | A | * | 11/1991 | Yoshinaka | C04B 35/80 428/614 |
| 9,955,244 | B2 | | 4/2018 | Rothkopf | |
| 10,753,863 | B1 | * | 8/2020 | Hug | G01J 3/2803 |
| 2010/0027015 | A1 | * | 2/2010 | Schweng | G01N 21/8507 356/432 |

(Continued)

FOREIGN PATENT DOCUMENTS

| JP | H085552 A | 1/1996 | |
| JP | 2017020901 A | 1/2017 | |
| WO | WO-2015023819 A1 * | 2/2015 | ............. G01J 3/108 |

OTHER PUBLICATIONS https://www.memsnet.org/material/aluminumoxideal2o3bulk/ (Year: 2002).*

*Primary Examiner* — Edmond C Lau
*Assistant Examiner* — Judy Dao Tran
(74) *Attorney, Agent, or Firm* — KENJA IP LAW PC (57) ABSTRACT

A gas detection device 1 comprises: a light emitter 10 configured to emit light of a wavelength band including a wavelength absorbed by a detection target gas; a light detector 20 having sensitivity to the wavelength band; a package 40; a light guide 50 configured to guide the light to the light detector 20; a joint 60 joining the package 40 and the light guide 50; and a heat insulator 70 located in a gap between the package 40 and the light guide 50, wherein part of a surface of the package 40 facing the light guide 50 has a proximity region D where a distance between the package 40 and the light guide 50 is 500 μm or less, and at least part of the heat insulator 70 and at least part of the joint 60 are located adjacent to each other in part of the proximity region D.

11 Claims, 5 Drawing Sheets

(56) References Cited

U.S. PATENT DOCUMENTS

| | | | | |
|---|---|---|---|---|
| 2015/0316472 A1* | 11/2015 | Yon | ............ | G08B 21/16 |
| | | | | 438/49 |
| 2016/0190415 A1* | 6/2016 | Park | ............ | H01L 33/486 |
| | | | | 257/98 |
| 2017/0311856 A1* | 11/2017 | Lasarov | ............ | A61B 5/0295 |
| 2018/0348121 A1* | 12/2018 | Deliwala | ............ | G01N 21/01 |
| 2019/0376889 A1* | 12/2019 | Takei | ............ | G01N 29/2418 |

* cited by examiner

GAS DETECTION DEVICE

TECHNICAL FIELD

The present disclosure relates to a gas detection device.

BACKGROUND

Gas detection devices are conventionally used in various fields. For example, a known gas detection device for detecting a gas to be detected (detection target gas) has a structure in which a light emitter that emits infrared light and a detector that detects infrared light of a specific wavelength are located inside a case having an ellipsoidal mirror (for example, see PTL 1).

With growing demand for installing gas detection devices in portable devices such as smartphones, gas detection devices are increasingly made smaller and thinner (for example, see PTL 2). Electronic components installed in a portable device are packed very densely, and accordingly the heating density is high. Moreover, the housing of the device has high airtightness for waterproof function, and tends to be filled with heat. Furthermore, a heat flow generated from a heat source such as a power source, a camera, or a processor installed in the portable device mainly diffuses into the surroundings through a substrate.

CITATION LIST

Patent Literature

PTL 1: Specification of US 2018/0348121 A1
PTL 2: Specification of U.S. Pat. No. 9,955,244 B2

SUMMARY

Figure 4:
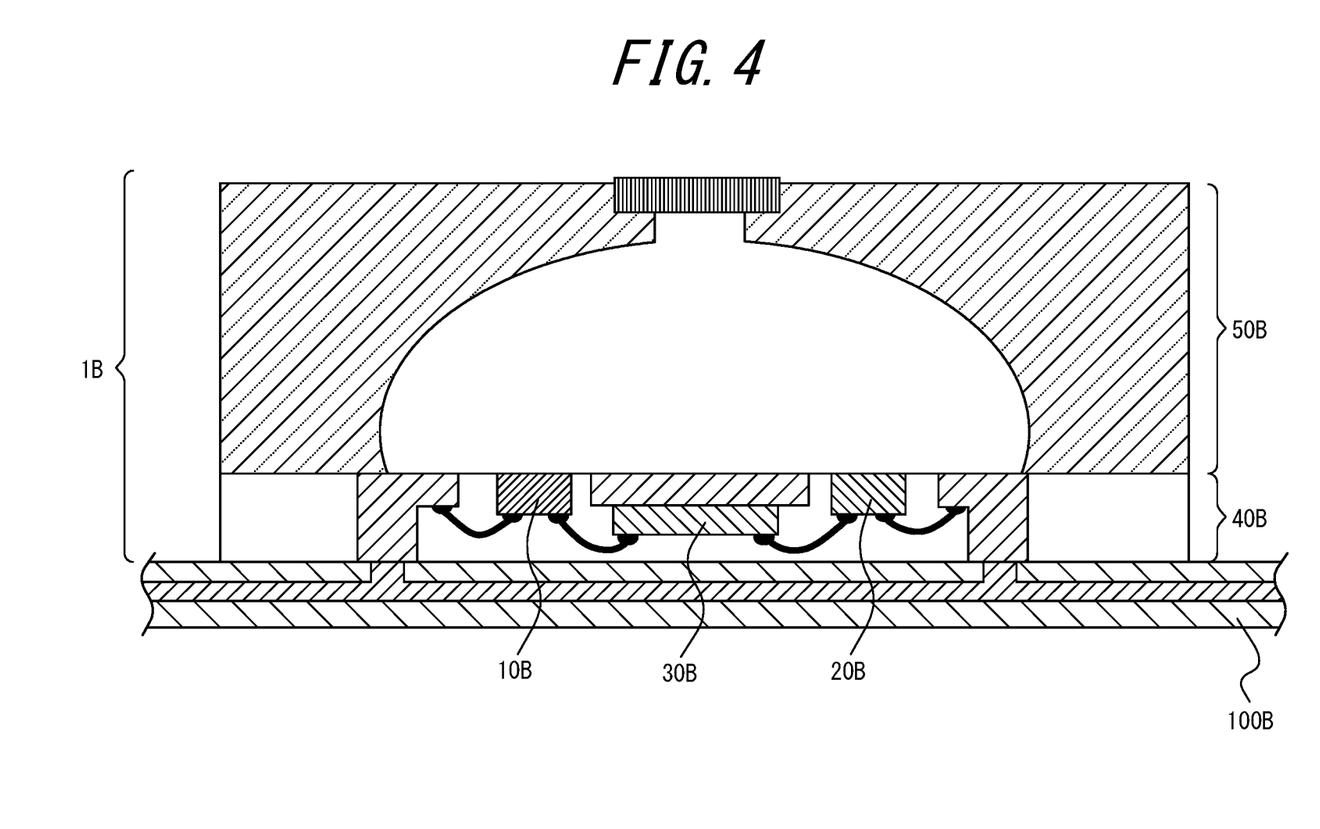
FIG. 4 is a schematic sectional view illustrating an example of the structure of a conventional gas detection device.

For example, in a conventional gas detection device 1B illustrated in FIG. 4, a package 40B and a light guide 50B are directly joined without a joint or the like therebetween, and the package 40B with low heat capacity and the light guide 50B with high heat capacity are not thermally insulated. Hence, a heat flow generated from a heat source flows into the light guide 50B more than the package 40B through a substrate 100B, causing non-uniform temperature inside the package 40B.

This causes the respective temperatures of a light emitter 10B, a light detector 20B, and a controller 30B contained in the package 40B to be not uniform, as a result of which the output signal of the gas detection device 1B becomes unstable. This problem is more noticeable when the gas detection device 1B is smaller.

It could therefore be helpful to provide a gas detection device capable of outputting a detection signal with high stability.

A gas detection device according to an embodiment comprises: a light emitter configured to emit light of a wavelength band including a wavelength absorbed by a detection target gas; a light detector having sensitivity to the wavelength band; a package containing the light emitter and the light detector; a light guide configured to guide the light to the light detector; a joint joining the package and the light guide; and a heat insulator located in a gap between the package and the light guide, wherein part of a surface of the package facing the light guide has a proximity region where a distance between the package and the light guide is 500 µm or less, and at least part of the heat insulator and at least part of the joint are located adjacent to each other in part of the proximity region.

It is thus possible to provide a gas detection device capable of outputting a detection signal with high stability.

DETAILED DESCRIPTION

One of the disclosed embodiments will be described in detail below, with reference to drawings. The same components are in principle given the same reference signs, and repeated description is omitted. In each drawing, the aspect ratios of the components are exaggerated and differ from the actual ratios, for convenience of illustration.

Herein, the upper side denotes the light guide side in the drawings and the lower side denotes the substrate side in the drawings, for convenience of illustration. These definitions are, however, merely used for convenience's sake, and the present disclosure is not limited to such.

<Gas Detection Device>

Figure 1:
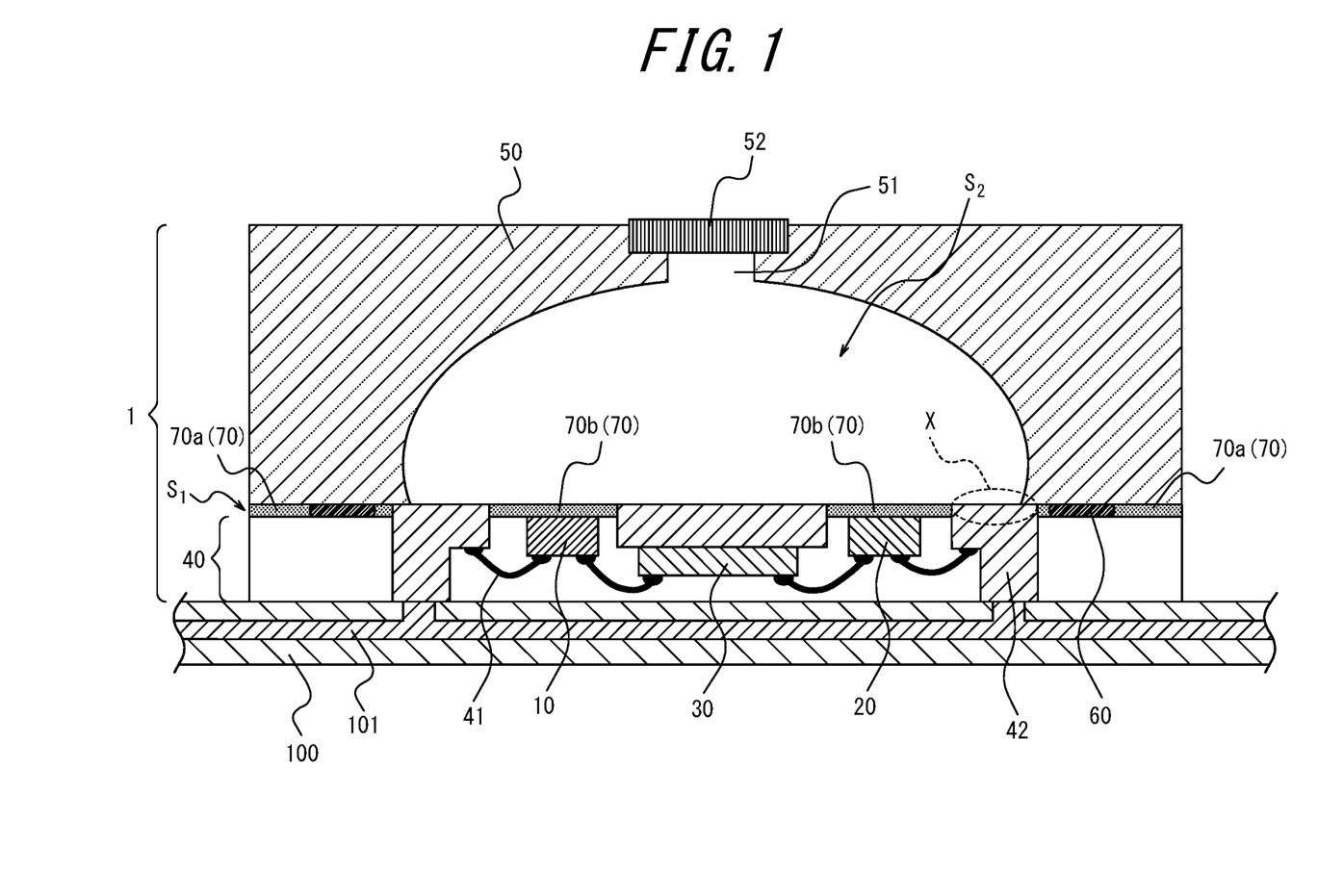
FIG. 1 is a schematic sectional view illustrating an example of the structure of a gas detection device according to one of the disclosed embodiments.
Figure 2A:
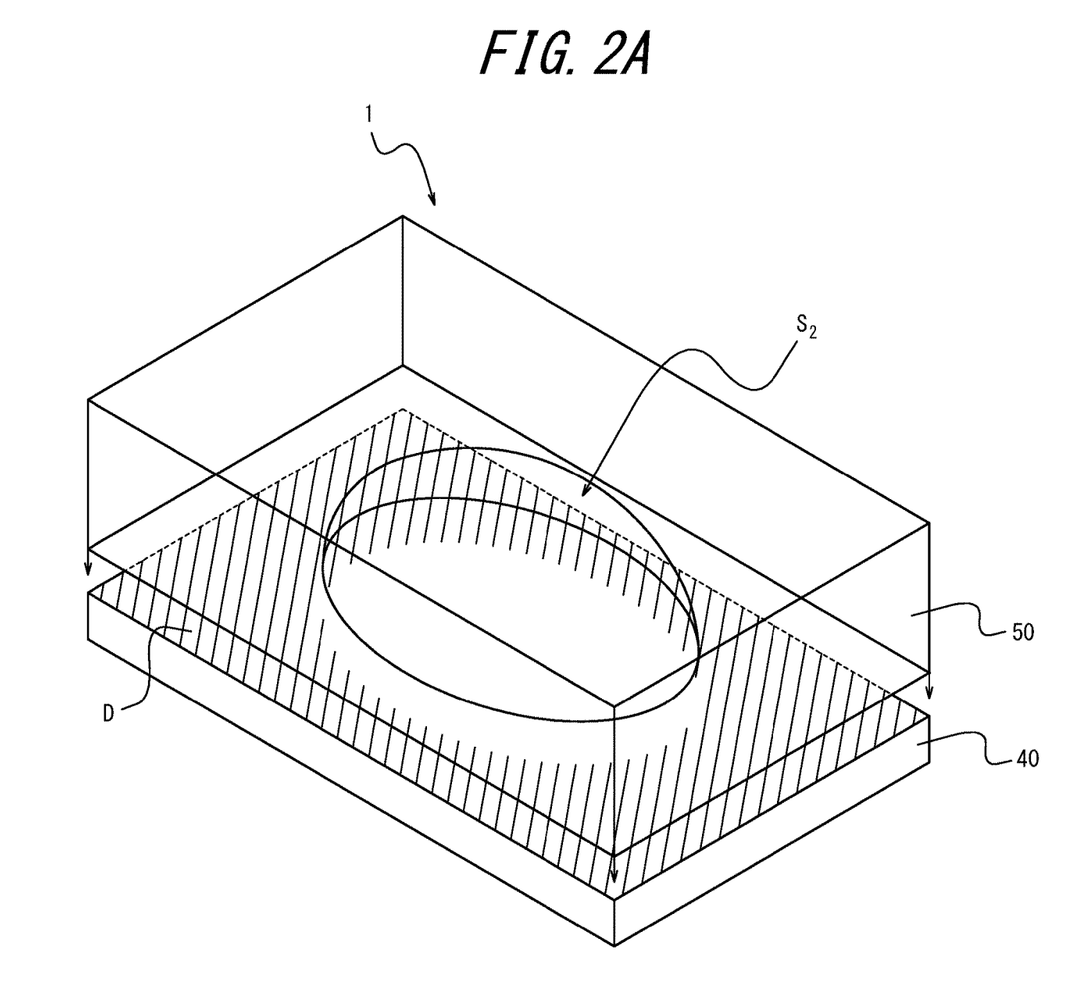
FIG. 2A is a perspective view illustrating an example of the structure of the gas detection device according to one of the disclosed embodiments.
Figure 2B:
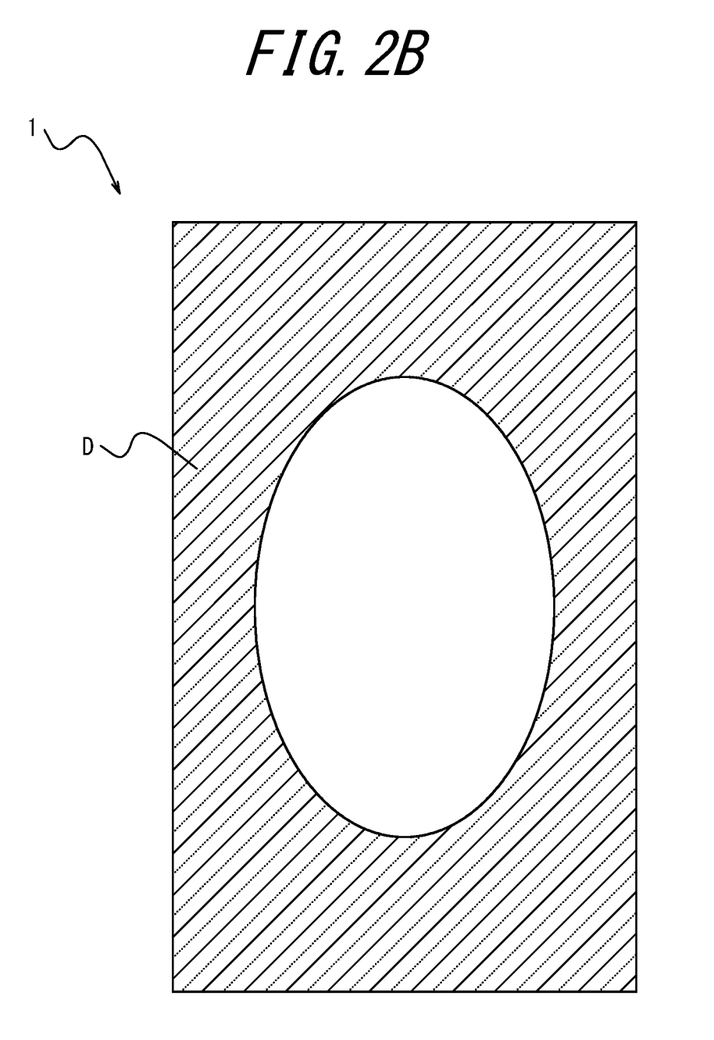
FIG. 2B is a plan view illustrating an example of the structure of the gas detection device according to one of the disclosed embodiments.

An example of the structure of a gas detection device 1 according to this embodiment will be described below, with reference to FIG. 1, FIG. 2A, and FIG. 2B.

The gas detection device 1 is a nondispersive infrared (NDIR) device that is mounted on a substrate 100 and detects the concentration of an introduced detection target gas based on the amount of infrared light absorbed by the detection target gas. The gas detection device 1 is, for example, a small device having a size of 7 mm in length, 5 mm in width, and 3 mm in height. Examples of the detection target gas include carbon dioxide, methane, water vapor, propane, formaldehyde, carbon monoxide, nitrogen monoxide, ammonia, sulfur dioxide, and alcohol.

The gas detection device 1 includes a light emitter 10, a light detector 20, a controller 30, a package 40, a light guide 50, a joint 60, and a heat insulator 70.

(Light Emitter)

The light emitter 10 emits light of a wavelength band including a wavelength absorbed by the detection target gas, in response to a drive current or a drive voltage supplied from the controller 30. For example, the light emitter 10 emits light of a wavelength band of 2.0 or more and 12.0 µm or less.

Examples of the light emitter 10 include a light emitting diode (LED), a lamp, a laser (light amplification by stimulated emission of radiation), an organic light emitting element, a microelectromechanical systems (MEMS) heater, and a vertical-cavity surface-emitting laser (VCSEL).

The light emitter 10 is contained in the package 40. In the gas detection device 1, a heat insulator 70a is located in a gap $S_1$ between the package 40 and the light guide 50, so that the thermal insulation between the package 40 and the light guide 50 is high. Therefore, even when a heat flow flows into the gas detection device 1, the heat flow is less likely to flow into the light guide 50. Thus, the temperature inside the package 40 is quickly uniformized, and the temperature of the light emitter 10 contained in the package 40 is quickly stabilized.

The upper surface of the light emitter 10 may be in contact with a heat insulator 70b. As a result of the heat insulator 70b being located on the upper surface of the light emitter 10, the temperature of the light emitter 10 can be further stabilized.

The light emitter 10 is preferably contained in the package 40, but may be located outside the package 40 in the case where it can be maintained at a temperature approximately equal to that of the light detector 20 and the controller 30 (error: within about ±0.1° C.).

The light emitter 10 may include an optical filter having a function of selectively transmitting light of part of the wavelength band.

(Light Detector)

The light detector 20 has sensitivity to the wavelength band including the wavelength absorbed by the detection target gas, and detects light that has transmitted through the detection target gas. For example, the light detector 20 detects light of a wavelength band of 2.0 µm or more and 12.0 µm or less. The light detector 20 outputs a detection signal indicating the concentration of the detection target gas to the controller 30, according to the amount of light detected. When the concentration of the detection target gas is higher, the amount of light detected by the light detector 20 is smaller. When the concentration of the detection target gas is lower, the amount of light detected by the light detector 20 is larger.

Examples of the light detector 20 include a photodiode, a phototransistor, a thermopile, a pyroelectric sensor, a bolometer, and a photoacoustic detector.

The light detector 20 is contained in the package 40. In the gas detection device 1, the heat insulator 70a is located in the gap $S_1$ between the package 40 and the light guide 50, so that the thermal insulation between the package 40 and the light guide 50 is high. Therefore, even when a heat flow flows into the gas detection device 1, the heat flow is less likely to flow into the light guide 50. Thus, the temperature inside the package 40 is quickly uniformized, and the temperature of the light detector 20 contained in the package 40 is quickly stabilized.

The upper surface of the light detector 20 may be in contact with the heat insulator 70b. As a result of the heat insulator 70b being located on the upper surface of the light detector 20, the temperature of the light detector 20 can be further stabilized.

The light detector 20 is preferably contained in the package 40, but may be located outside the package 40 in the case where it can be maintained at a temperature approximately equal to that of the light emitter 10 and the controller 30 (error: within about ±0.1° C.).

The light detector 20 may include an optical filter having a function of selectively transmitting light of part of the wavelength band.

(Controller)

The controller 30 may include at least one of a general-purpose processor that executes functions according to a read program and a dedicated processor specialized in specific processes. The dedicated processor may include an application specific integrated circuit (ASIC) or non-volatile/volatile memory.

The controller 30 controls the light emitter 10 and the light detector 20. For example, in the case where the light detector 20 is not used in the gas detection device 1, the controller 30 can control the light emitter 10 alone. For example, in the case where the light emitter 10 is not used in the gas detection device 1, the controller 30 can control the light detector 20 alone.

The controller 30 is contained in the package 40. In the gas detection device 1, the heat insulator 70a is located in the gap $S_1$ between the package 40 and the light guide 50, so that the thermal insulation between the package 40 and the light guide 50 is high. Therefore, even when a heat flow flows into the gas detection device 1, the heat flow is less likely to flow into the light guide 50. Thus, the temperature inside the package 40 is quickly uniformized, and the temperature of the controller 30 contained in the package 40 is quickly stabilized.

The controller 30 is preferably contained in the package 40, but may be located outside the package 40 or outside the gas detection device 1.

(Package)

The package 40 is joined to the light guide 50 by the joint 60. As a result of the package 40 and the light guide 50 being joined via the joint 60, the gap $S_1$ is formed between the package 40 and the light guide 50.

The package 40 contains the light emitter 10, the light detector 20, and the controller 30. In the gas detection device 1, the heat insulator 70a is located in the gap $S_1$ between the package 40 and the light guide 50, so that the thermal insulation between the package 40 and the light guide 50 is high. Therefore, even when a heat flow flows into the gas detection device 1, the heat flow is less likely to flow into the light guide 50. Thus, the temperature inside the package 40 is quickly uniformized (temperature uniformizing effect). Moreover, the heat insulator 70b in contact with the upper surface of the light emitter 10 and the upper surface of the light detector 20 is located in a detection space $S_2$ between the package 40 and the light guide 50, so that the temperature inside the package 40 can be prevented from being non-uniform due to structural non-uniformity of the light guide 50. Consequently, the respective temperatures of the light emitter 10, the light detector 20, and the controller 30 contained in the package 40 are quickly uniformized, and a steady temperature state can be maintained.

In addition to the light emitter 10, the light detector 20, and the controller 30, the package 40 contains metal members such as metal wires 41 for electrically connecting these elements and a lead frame 42 for enabling electrical connection to the outside.

The package 40 has a convex portion X that is in contact with the light guide 50. As a result of the package 40 having the convex portion X in contact with the light guide 50, for example even in the case where the thickness of the joint 60 becomes excessively thin during a mass production process, the gap $S_1$ can be formed between the package 40 and the light guide 50 and a certain distance (for example, about 2 µm to 5 µm) can be maintained between the package 40 and the light guide 50. Thus, by providing the heat insulator 70a in the gap $S_1$, the thermal insulation between the package 40 and the light guide 50 can be enhanced.

The convex portion X may be produced intentionally. Alternatively, for example, the convex portion X may be a protrusion of the lead frame 42 formed accidentally. The use of the protrusion as the convex portion X eliminates the need for a special production process for forming the convex portion X, and the gap $S_1$ can be formed between the package 40 and the light guide 50 easily.

The content ratio of the metal members in the package 40 is preferably 25% or more, and more preferably 33% or more. When the content ratio of the metal members in the package 40 is higher, the thermal resistance of the package 40 is lower. As a result of the content ratio of the metal members being within this range, heat can be quickly diffused inside the package 40, and the temperature inside the package 40 can be quickly uniformized.

The temperature inside the package 40 is not limited as long as it is uniform. At least the error of the respective temperatures of the light emitter 10, the light detector 20, and the controller 30 is limited to be within about ±0.1° C.

The package 40 is preferably made of an insulating material. Examples of such a material include thermosetting resins such as epoxy resin, and thermosetting resins obtained by mixing these resins with silica fillers.

The metal wires 41 are preferably made of a good conductor. For example, the metal wires 41 are preferably made of a metal such as gold, an alloy, aluminum, or the like. The lead frame 42 is preferably made of a good conductor. For example, the lead frame 42 is preferably made of a metal such as copper, an alloy, carbon, or the like. For example, in the case where the lead frame 42 is made of copper having high heat conductivity (heat conductivity: 398 W/m·K), a heat flow can be quickly flown into the package 40. This further enhances the temperature uniformizing effect.

(Light Guide)

The light guide 50 reflects light emitted from the light emitter 10 one or more times in the detection space $S_2$ to guide the light to the light detector 20. The light emitter 10 and the light detector 20 are optically connected via the light guide 50.

The light guide 50 is joined to the package 40 by the joint 60. As a result of the package 40 and the light guide 50 being joined via the joint 60, the gap $S_1$ is formed between the package 40 and the light guide 50.

The light guide 50 includes an ellipsoidal mirror in which the inner surface of an ellipsoid is a mirror. The light guide 50 may further include, for example, optical elements such as a plane mirror, a concave mirror or a convex mirror, a lens, and a diffraction grating.

The mirror is made of, for example, metal, glass, ceramics, or stainless steel.

The mirror is preferably made of a material having a low light absorption coefficient and high reflectance, from the viewpoint of sensitivity improvement. Examples of such a material include alloys containing aluminum, gold, and silver, dielectrics, and resin housings coated with laminates thereof. Examples of the material of the resin housing include liquid crystal polymers (LCP), polypropylene (PP), polyetheretherketone (PEEK), polyamide (PA), polyphenylene ether (PPE), polycarbonate (PC), polyphenylene sulfide (PPS), polymethylmethacrylate resin (PMMA), and hard resins obtained by mixing two or more thereof.

The mirror is preferably made of a resin housing coated with gold or an alloy layer containing gold, from the viewpoint of improving reliability and suppressing time degradation. Further, a dielectric laminated film is preferably formed on the surface of the metal layer, in order to enhance the reflectance. In the case where the inner surface of the light guide 50 is formed by performing vapor deposition or coating on a resin housing, the productivity can be improved and weight reduction can be achieved. Moreover, in the case where the inner surface of the light guide 50 is formed by performing vapor deposition or coating on a resin housing, the difference in thermal expansion coefficient between the package 40 and the light guide 50 decreases, with it being possible to suppress thermal deformation and reduce variation in sensitivity.

The production process for the light guide 50 is not limited. For example, the light guide 50 may be formed by cutting work. Alternatively, the light guide 50 may be formed by injection molding, from the viewpoint of productivity and the like.

The light guide 50 further includes a gas port 51 and a dust filter 52. The gas port 51 is a port for introducing the detection target gas into the detection space $S_2$ or discharging the detection target gas from the detection space $S_2$. The dust filter 52 is a filter attached to the gas port 51 to prevent dust, dirt, and the like from entering in the detection space $S_2$.

The gas port 51 is preferably located in an upper part of the light guide 50. As a result of the gas port 51 being located in the upper part of the light guide 50, the dust filter 52 can be easily attached to the gas port 51, and the production process for the light guide 50 can be facilitated. The gas port 51 may be located in a side part of the light guide 50. In the case where the gas port 51 is located in the side part of the light guide 50, the position of the gas port 51 may be adjusted so as to at least keep the gas port 51 from being in contact with the joint 60 and the heat insulator 70. The introduction of the detection target gas into the detection space $S_2$ may be limited to be only from the gas port 51.

(Joint)

The joint 60 joins the package 40 and the light guide 50. At least part of the joint 60 is located adjacent to the heat insulator 70 in part of the below-described proximity region D. Although another member may be interposed between the joint 60 and the heat insulator 70, the joint 60 and the heat insulator 70 are preferably in direct contact with each other. The thickness of the joint 60 is preferably 2 or more and 500 μm or less. As a result of the thickness of the joint 60 being within this range, even if the package 40 does not have the convex portion X, the gap $S_1$ can be formed between the package 40 and the light guide 50 and a certain distance can be maintained between the package 40 and the light guide 50.

The joint 60 is preferably made of a thermosetting material. For example, the joint 60 is preferably made of a thermosetting resin such as epoxy resin, a resin obtained by adding a ceramic material to a thermosetting resin, a metal paste, or the like. Such a material of the joint 60 may contain beads, fillers, etc. As a result of the joint 60 containing beads, fillers, etc., the thickness of the joint 60 can be prevented from becoming excessively thin in a mass production process.

The production process for the joint 60 is not limited. For example, the joint 60 is formed by applying a resin material to the package 40, then placing the light guide 50 on the package 40, and then subjecting the applied resin material to a heating curing process.

Although a heat flow slightly flows into the light guide 50 through the joint 60, its speed is very slow. It is therefore possible to avoid the problem with the conventional gas detection device 1B in that a heat flow flows into the light guide 50B more than the package 40B and the temperature inside the package 40B becomes non-uniform.

(Heat Insulator)

The heat insulator 70 is located in the space between the package 40 and the light guide 50, and has a function of enhancing the thermal insulation between the package 40 and the light guide 50. For example, the heat insulator 70a is located in the gap $S_1$ between the package 40 and the light guide 50, and the heat insulator 70b is located in the detection space $S_2$ between the package 40 and the light guide 50.

As a result of the heat insulator 70a being located in the gap $S_1$ between the package 40 and the light guide 50, the thermal insulation between the package 40 and the light guide 50 can be enhanced. Therefore, even when a heat flow flows into the gas detection device 1, the heat flow is less likely to flow into the light guide 50. Thus, the temperature inside the package 40 is quickly uniformized, and the respective temperatures of the light emitter 10, the light detector 20, and the controller 30 contained in the package 40 are quickly uniformized by the temperature uniformizing effect. The gas detection device 1 can thus output a detection signal with high stability.

As a result of the heat insulator 70b being located in the detection space $S_2$ between the package 40 and the light guide 50, the temperature of the light emitter 10 and the temperature of the light detector 20 can be stabilized, and the temperature inside the package 40 can be prevented from being non-uniform due to structural non-uniformity of the light guide 50. Consequently, the respective temperatures of the light emitter 10, the light detector 20, and the controller 30 contained in the package 40 are quickly uniformized, and a steady temperature state can be maintained. The gas detection device 1 can thus output a detection signal with high stability.

The heat insulator 70 is preferably made of a material having high thermal insulation and containing a large amount of gas or space with respect to the material volume. Examples of such a material include air, porous substances, zeolite materials, foamed resins, and fibrous materials such as glass wool and ceramic fibers.

The heat conductivity of the heat insulator 70 is preferably 0.1 W/m·K or less. When the heat conductivity of the heat insulator 70 is lower, the thermal resistance is higher, and the temperature uniformizing effect can be enhanced. For example, air has a very low heat conductivity of 0.0257 W/m·K at 20° C. That is, air is a material that has low heat conductivity and can be used easily at low cost, and accordingly it is most preferable to use air as the heat insulator 70. The heat conductivity of the heat insulator 70 is preferably lower than the heat conductivity of the joint 60, from the viewpoint of further enhancing the thermal insulation.

The thickness of the heat insulator 70 is preferably 2 μm or more and 500 μm or less. When the heat insulator 70 is thicker, the thermal resistance is higher, and the temperature uniformizing effect can be enhanced. If the heat insulator 70 is excessively thick, however, foreign matter such as dust tends to mix in $S_2$, causing a decrease in its function. As a result of the thickness of the heat insulator 70 being within the foregoing range, mixing of foreign matter can be prevented while enhancing the temperature uniformizing effect.

For example, the heat conductivity of epoxy resin is 0.3 W/m·K, and the heat conductivity of air is 0.0257 W/m·K. The heat conductivity of epoxy resin is an order of magnitude higher than the heat conductivity of air. Hence, for example, in the case of using epoxy resin in the heat insulator 70, the thickness of the heat insulator 70 is set to be an order of magnitude thicker than in the case of using air in the heat insulator 70.

As described above, it is preferable to appropriately adjust the heat conductivity, the thickness, and the like of the heat insulator 70 depending on the material used. This enhances the temperature uniformizing effect.

At least part of the heat insulator 70 is located in part of the proximity region D. The coverage factor of the at least part of the heat insulator 70 is preferably 30% or more, and more preferably 50% or more and 90% or less. As illustrated in FIG. 2A and FIG. 2B, the proximity region D is a region of the surface of the package 40 facing the light guide 50, and is a region where the distance between the package 40 and the light guide 50 is 500 μm or less. The coverage factor is the proportion of the area of the heat insulator 70 covering the proximity region D to the area of the proximity region D.

When the coverage factor of the heat insulator 70 is higher, the thermal resistance is higher, and the temperature uniformizing effect can be enhanced. When the coverage factor of the heat insulator 70 is lower, the thermal resistance is lower, but the proportion of the area of the joint 60 covering the proximity region D to the area of the proximity region D can be increased, which contributes to higher joining strength between the package 40 and the light guide 50. Accordingly, the coverage factor is preferably determined in consideration of the balance between the temperature uniformizing effect and the joining strength. As a result of the coverage factor of the heat insulator 70 being within the foregoing range, the joining strength between the package 40 and the light guide 50 can be appropriately maintained while enhancing the temperature uniformizing effect.

As described above, as a result of the heat insulator 70 being located in the space between the package 40 and the light guide 50, the thermal insulation between the package 40 and the light guide 50 can be enhanced. Therefore, even when a heat flow flows into the gas detection device 1, the heat flow can be effectively kept from flowing into the light guide 50. Thus, the temperature inside the package 40 can be quickly uniformized.

(Substrate)

The substrate 100 carries and fixes the gas detection device 1. The substrate 100 is, for example, a printed substrate, a flexible printed substrate, or a rigid flexible substrate.

The substrate 100 includes metal wiring 101, a base material, a resin, and the like. The substrate 100 is electrically connected to, for example, the light emitter 10, the light detector 20, and the controller 30 contained in the package 40 via the lead frame 42.

Examples of the base material include paper, glass cloth, polyimide film, PET film, and ceramics. Examples of the resin include phenol resin, epoxy resin, polyimide resin, bismaleimide triazine resin, fluororesin, and polyphenylene oxide resin.

In the gas detection device 1 according to this embodiment, the gap $S_1$ is formed between the light guide 50 and the package 40 by the joint 60 or the convex portion X, and the heat insulator 70a is located in the gap $S_1$. This enhances the thermal insulation between the package 40 and the light guide 50, so that a heat flow flowing into the gas detection device 1 can be kept from flowing into the light guide 50 and the temperature inside the package 40 can be quickly uniformized. Hence, the gas detection device 1, even when reduced in size, can output a detection signal with high stability.

<Modification>

Figure 3:
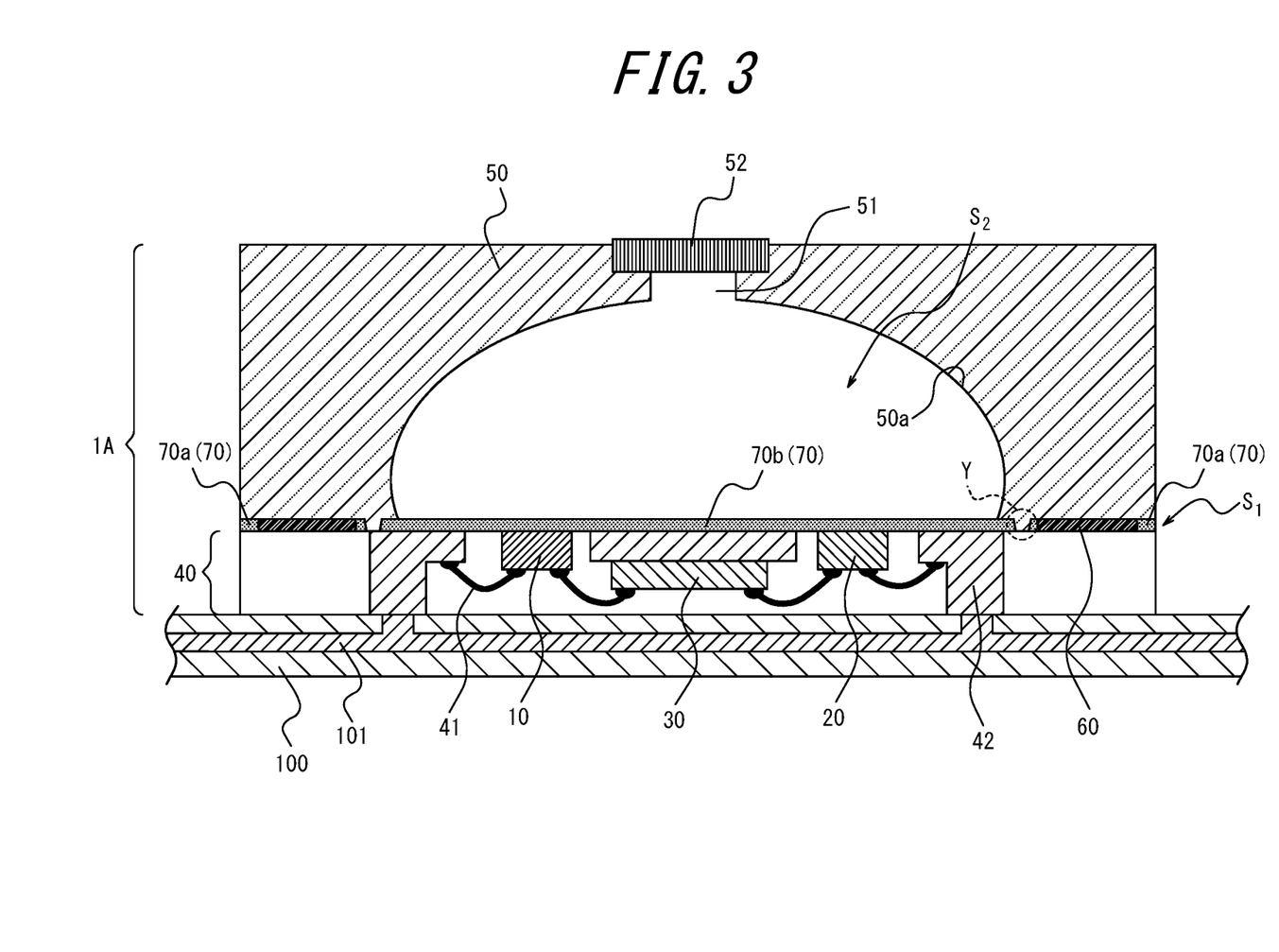
FIG. 3 is a schematic sectional view illustrating an example of the structure of a gas detection device according to a modification.

An example of the structure of a gas detection device 1A according to a modification will be described below, with reference to FIG. 3.

The gas detection device 1A according to Modification 1 differs from the gas detection device 1 according to the foregoing embodiment in the following: While the gas detection device 1 according to the foregoing embodiment has the convex portion X on the package 40 side, the gas detection device 1A according to Modification 1 has a convex portion Y on the light guide 50 side. The other structures are the same as those in the gas detection device 1 according to the foregoing embodiment, and repeated description is omitted.

The light guide 50 has the convex portion Y that is in contact with the package 40. As a result of the light guide 50 having the convex portion Y in contact with the package 40, for example even in the case where the thickness of the joint 60 becomes excessively thin during a mass production process, the gap $S_1$ can be formed between the package 40 and the light guide 50 and a certain distance (for example, about 2 μm to 5 μm) can be maintained between the package 40 and the light guide 50. Thus, by providing the heat insulator 70a in the gap $S_1$, the thermal insulation between the package 40 and the light guide 50 can be enhanced.

The convex portion Y may be produced intentionally.

Alternatively, for example, the convex portion Y may be a burr formed accidentally. The use of the burr as the convex portion Y eliminates the need for a special production process for forming the convex portion Y, and the gap $S_1$ can be formed between the package 40 and the light guide 50 easily.

In the gas detection device 1A according to this modification, the gap $S_1$ is formed between the light guide 50 and the package 40 by the joint 60 or the convex portion Y, and the heat insulator 70a is located in the gap $S_1$. This enhances the thermal insulation between the package 40 and the light guide 50, so that a heat flow flowing into the gas detection device 1A can be kept from flowing into the light guide 50 and the temperature inside the package 40 can be quickly uniformized. Hence, the gas detection device 1A, even when reduced in size, can output a detection signal with high stability.

Although the embodiments have been described above as representative examples, it should be obvious to those skilled in the art that many changes and substitutions may be made to the embodiments described above within the spirit and scope of the present disclosure. Therefore, the embodiments described above should not be construed as limiting the present disclosure, and various modifications and changes are possible without departing from the scope of the claims.

The invention claimed is:

1. A gas detection device comprising:
    a light emitter configured to emit light of a wavelength band including a wavelength absorbed by a detection target gas;
    a light detector having sensitivity to the wavelength band;
    a package containing the light emitter and the light detector;
    a light guide configured to guide the light to the light detector;
    a joint directly connected to the package and the light guide; and
    a heat insulator located in a gap between the package and the light guide,
    wherein part of a surface of the package facing the light guide has a proximity region where a distance between the package and the light guide is 500 μm or less,
    the joint and the heat insulator are made of different materials;
    at least part of the heat insulator and at least part of the joint are located on the same layer and are directly adjacent to each other in a planar view from above the proximity region; and
    a coverage factor of at least part of the heat insulator is in a range of 30% to 90%.

2. The gas detection device according to claim 1, wherein the heat insulator has a heat conductivity of 0.1 W/m·K or less.

3. The gas detection device according to claim 1, wherein the heat insulator has a thickness of 2 μm or more and 500 μm or less.

4. The gas detection device according to claim 1, wherein a content ratio of electrical connectors to the package is 25% or more.

5. The gas detection device according to claim 1, wherein the package has a convex portion that is in contact with the light guide.

6. The gas detection device according to claim 1, wherein the light guide has a convex portion that is in contact with the package.

7. The gas detection device according to claim 1, further comprising
    a controller configured to control the light emitter and the light detector,
    wherein the package contains the controller.

8. The gas detection device according to claim 1, wherein the heat insulator is lower in heat conductivity than the joint.

9. The gas detection device according to claim 1, wherein the light guide has a gas port for introducing the detection target gas.

10. The gas detection device according to claim 1, wherein the joint is at least one selected from the group consisting of an epoxy resin, a resin obtained by adding a ceramic material to a thermosetting resin, and a metal paste.

11. The gas detection device according to claim 1, wherein the heat insulator is at least one selected from the group consisting of a gas, porous substances, zeolite materials, foamed resins, and fibrous materials.

* * * * *